(12) United States Patent
Wachsmann et al.

(10) Patent No.: US 8,757,730 B2
(45) Date of Patent: Jun. 24, 2014

(54) MONITORING APPARATUS FOR A GROUND PROCESSING MACHINE

(75) Inventors: Steffen Wachsmann, Koblenz (DE); Robert Laux, Neuwied (DE)

(73) Assignee: BOMAG GmbH, Boppard (DE)

( * ) Notice: Subject to any disclaimer, the term of this patent is extended or adjusted under 35 U.S.C. 154(b) by 0 days.

(21) Appl. No.: 13/640,377

(22) PCT Filed: Apr. 14, 2011

(86) PCT No.: PCT/EP2011/001910
§ 371 (c)(1),
(2), (4) Date: Dec. 17, 2012

(87) PCT Pub. No.: WO2011/128105
PCT Pub. Date: Oct. 20, 2011

(65) Prior Publication Data
US 2013/0128279 A1    May 23, 2013

(30) Foreign Application Priority Data
Apr. 14, 2010 (DE) .......................... 10 2010 014 903

(51) Int. Cl.
*E01C 23/08* (2006.01)
*E01C 23/088* (2006.01)

(52) U.S. Cl.
CPC .................................... *E01C 23/088* (2013.01)
USPC .......................................... 299/1.5; 299/39.4

(58) Field of Classification Search
USPC ........................ 299/1.05, 1.5, 36.1, 39.1, 39.4
See application file for complete search history.

(56) References Cited

U.S. PATENT DOCUMENTS

| 5,607,205 | A  | * | 3/1997 | Burdick et al. ................. 299/1.5 |
| 7,510,347 | B2 | * | 3/2009 | Lemke .......................... 404/84.5 |
| 8,386,196 | B2 | * | 2/2013 | Wagner et al. .................. 702/34 |
| 2004/0068896 | A1 | | 4/2004 | Sehr |
| 2004/0161299 | A1 | * | 8/2004 | Smith ............................ 404/75 |

(Continued)

FOREIGN PATENT DOCUMENTS

| DE | 102 03 732 A1 | 8/2003 |
| EP | 2 037 042 A1  | 3/2009 |

(Continued)

OTHER PUBLICATIONS

Espacenet.com, English Machine Translation of International Publication No. WO0246533A1, published Jun. 13, 2002, retrieved from http://worldwide.espacenet.com on Oct. 1, 2012 (12 pages).

(Continued)

*Primary Examiner* — David Bagnell
*Assistant Examiner* — Michael Goodwin
(74) *Attorney, Agent, or Firm* — Wood, Herron & Evans, LLP

(57) ABSTRACT

The present invention relates to a monitoring apparatus for a ground processing machine, especially a ground milling machine, with the ground processing machine comprising at least one processing device for mechanically processing a ground surface and/or for applying a ground cover layer, comprising: at least one detection device for contactless detection at least in sections of a condition of the ground surface and/or the ground cover layer as produced by the processing device, and an evaluation device for the automated evaluation of the condition detected by the detection device. The present invention further relates to a ground processing machine, especially a ground milling machine, comprising at least one such monitoring apparatus.

13 Claims, 2 Drawing Sheets

(56) References Cited

U.S. PATENT DOCUMENTS

| | | | |
|---|---|---|---|
| 2005/0207841 A1* | 9/2005 | Holl et al. ........................ | 404/94 |
| 2009/0074510 A1 | 3/2009 | Von Schonebeck et al. | |
| 2010/0076697 A1 | 3/2010 | Wagner et al. | |
| 2011/0121633 A1* | 5/2011 | Hall et al. .................... | 299/39.2 |

FOREIGN PATENT DOCUMENTS

| | | |
|---|---|---|
| EP | 2 161 375 A2 | 3/2010 |
| WO | 02/46533 A1 | 6/2002 |
| WO | 03/064770 A1 | 8/2003 |
| WO | 2004/074579 A1 | 9/2004 |

OTHER PUBLICATIONS

Espacenet.com, English Machine Translation of International Publication No. WO03064770A1, published Aug. 7, 2003, retrieved from http://worldwide.espacenet.com on Oct. 1, 2012 (11 pages).

Espacenet.com, English Machine Translation of German Application No. DE10203732A1, published Aug. 21, 2003, retrieved from http://worldwide.espacenet.com on Oct. 1, 2012 (10 pages).

Espacenet.com, English Machine Translation of European Application No. EP2037042A1, published Mar. 18, 2009, retrieved from http://worldwide.espacenet.com on Oct. 1, 2012 (12 pages).

Espacenet.com, English Machine Translation of Europen Application No. EP2161375A2, published Mar. 10, 2010, retrieved from http://worldwide.espacenet.com on Oct. 1, 2012 (15 pages).

World Intellectual Property Organization, International Search Report of International Application No. PCT/EP2011/001910, dated May 4, 2012 (8 pages).

World Intellectual Property Organization, Written Opinion of the International Search Report of International Application No. PCT/EP2011/001910, dated May 4, 2012 (10 pages).

* cited by examiner

MONITORING APPARATUS FOR A GROUND PROCESSING MACHINE

CROSS-REFERENCE TO RELATED APPLICATIONS

This application is a submission under 35 U.S.C. §371 of International Application No. PCT/EP2011/001910, filed Apr. 14, 2011, which claims priority to German Application No. 10 2010 014 903.9, filed Apr. 14, 2010, the disclosures of which are hereby expressly incorporated by reference herein in their entireties.

FIELD OF THE INVENTION

The present invention relates to a monitoring apparatus for a ground processing machine, with the ground processing machine comprising at least one processing device for mechanically processing the surface of the ground and/or for producing a ground cover layer. The present invention particularly relates to a monitoring apparatus for a ground milling machine, with the ground milling machine comprising at least one milling roller provided with a plurality of milling chisels. The present invention further relates to a ground processing machine with at least one such monitoring apparatus.

BACKGROUND OF THE INVENTION

The condition of the surface of a ground and/or a ground cover layer produced by a ground processing machine allows drawing conclusions on the working process and/or on the state of the ground processing machine and its processing device. The change in the milling texture in the ground surface as produced by a ground milling machine can provide information on progressing wear and tear of the milling chisels or even chisel breakage. The monitoring of the work result in a ground processing machine by detecting the produced condition of the ground surface and/or the ground cover layer is therefore useful.

It is proposed in DE 102 03 732 A1 to detect and monitor the operating state of a machine component of a ground milling machine which is directly or indirectly involved in the milling process during the work operation. As soon as a determined characteristic value indicates an impermissible deviation from a target value, the machine operator will be notified, who will thereupon inspect the milling chisels and optionally exchange the same. The disadvantageous aspect is that the milling texture produced by the milling chisels or the milling roller in the ground structure is not taken into account. It is therefore further proposed in DE 102 03 732 A1 to optically detect the produced milling texture by means of a camera and to display such texture by a screen device to the machine operator. The machine operator is then able to check the quality of the produced milling texture, which, however, requires permanent attention of the machine operator.

SUMMARY OF THE INVENTION

It is an object of the present invention to provide possibilities for optimized working operation of a ground processing machine of the type described above.

A monitoring apparatus for a ground processing machine is proposed for achieving the object, with the ground processing machine comprising at least one processing device, configured as a milling roller, for mechanically processing the ground, comprising at least one detection device for contactless detection of a condition of the ground surface, especially of the milling texture produced by the milling roller at least in certain areas, and comprising at least one evaluation device for the automatic evaluation of the condition detected by the detection device. The detection device can detect the condition in a continuous or discontinuous manner, e.g., in defined intervals.

During the detection, an electronic representation of the real condition will be generated in the widest sense and will be supplied thereafter to the evaluation device, which will thereafter automatically evaluate such information and will compare the same with target specifications and/or preceding detections. A recognized impermissible condition will be indicated to the machine operator and/or be transmitted to a control device of the ground processing machine, which control device will then initiate suitable countermeasures for example, optionally in cooperation with the monitoring apparatus, in order to achieve a desired condition or a condition according to the target specifications. In the context of the present invention, the term "condition" shall comprise the surface formation and structure and/or the profile of the ground surface and/or the ground cover layer as produced by the milling machine, i.e., the milling texture produced by the milling machine.

The proposed monitoring apparatus is used for example for monitoring in a ground stabilizing machine (e.g., ground stabilizer). The mixing or demixing of two components for example (e.g., lime and a mineral mixture) can be determined and monitored on the basis of the detected condition, and can optionally be modified in a control loop. The proposed monitoring apparatus can also be used for example for monitoring in a ground recycling machine (e.g., road recycler). The demixing or thorough mixing of two components (e.g., recycling material and cold bitumen) can be determined and monitored for example on the basis of the detected condition, and can optionally be modified in a control loop. The proposed monitoring apparatus can also be used for monitoring in a ground production machine (e.g., a tar or asphalt spreader). The demixing or thorough mixing as well as the planarity, road profile, potential offset edges (e.g., offset between basic screed and extendable screed) can be detected and monitored on the basis of the detected condition, and can optionally be changed in a control loop.

According to one embodiment of the present invention, the detection device is preferably based on the principle of optical imaging or scanning, or operates according to this principle. According to one embodiment of the present invention, the detection device comprises at least one camera and the evaluation device comprises at least one image processing module. Further, the detection device according to one aspect of the present invention can be based on the principle of scanning by means of laser, infrared, sound, x-rays, radio waves or the like, or operates according to one of these principles. Further, the detection device according to one aspect of the present invention is preferably based on the principle of planar imaging, planar scanning and/or linear scanning, or operates according to one of these principles. Furthermore, the description below in connection with a monitoring apparatus in accordance with the present invention for a ground milling machine also apply analogously.

According to one embodiment of the present invention, the ground milling machine comprises at least one milling roller provided with a plurality of milling chisels, at least one detection device for contactless detection at least in sections of the milling texture produced by the milling roller or the milling chisels, and comprising (at least) one evaluation device for the automatic evaluation of the milling texture detected by the detection device. The detection device can detect the milling texture produced by the milling roller in a continuous or discontinuous manner, e.g., in defined intervals. In this process, an electronic image (which can also consist of several individual images or an image sequence) of the milling texture generated in reality is generated in the widest sense and is supplied to the evaluation device which will evaluate the detected milling texture with respect to wearing phenomena and/or failure phenomena in the milling chisels. Furthermore, an automated quality evaluation of the generated milling texture is also possible. The detection device can further comprise a preparation module for the detected data. The evaluation device can be a computer device (or the like) for example with implemented software suitable for the evaluation in accordance with the present invention.

This monitoring apparatus is arranged for the use in a ground milling machine with at least one milling roller, with the milling roller being provided with at least one and preferably with a plurality of exchangeable milling chisels or milling blades. Such ground milling machines for removing the ground surface, especially for removing the surface or cover layer of a road surface, are known from the prior art. The milling roller will rotate during the working operation or milling process, with the milling chisels coming into engagement with the ground surface to be processed and partly removing the surface. The milling chisels are subjected to continued wear and tear in this process. Furthermore, the breakage of chisels can lead to an early failure of a milling chisel. This will lead in both cases to significant changes in the milling texture which are also visible.

According to one embodiment of the present invention, the evaluation device is arranged to determine the wear and tear and/or the failure of at least one milling chisel on the basis of the comparison of a momentarily detected milling texture with a milling texture detected at an earlier point in time. Such an approach is suitable in continuous detection of the generated milling texture. Alternatively, and/or additionally, the detected milling texture can be compared with a target milling texture or ideal milling texture stored in a database, for example.

According to one aspect of the present invention, the milling texture produced in reality by the milling roller or the milling chisels will be advantageously detected and supplied to evaluation, with the produced milling texture being of decisive interest in particular. No manual monitoring is required as a result of the automated evaluation, so that the machine operator is able to concentrate on other processes such as steering the ground milling machine. Furthermore, objective quality evaluation of the produced milling texture is possible irrespective of subjective criteria of the machine operator.

According to a preferred further development according to one embodiment, the evaluation device is arranged to automatically determine or establish the wear and tear and/or the early failure of at least one milling chisel on the basis of the detected milling texture. In this respect, the monitoring apparatus can also be referred to as a milling chisel monitoring apparatus. Once the wear and tear reaches a critical level or if a milling chisel fails as a result of mechanical damage or breakage for example, the produced milling texture will change. This will be automatically recognized by the evaluation device on the basis of the evaluation of the detected milling texture and will be indicated to the machine operator. For this purpose, the monitoring apparatus preferably comprises a display apparatus such as a signal lamp or a screen (monitor). Furthermore, the evaluation device can be coupled with the machine control unit (e.g., via a machine-based CAN bus) and cause a standstill of the ground milling machine when impermissible wear and tear in a milling chisel or the failure of at least one milling chisel has been recognized. It is also possible that the advancement or the milling roller speed will be adjusted. It is further possible that the evaluation device will forecast the progressing wear and tear of the milling chisel and will inform the machine operator in due time of the imminent exchange. As a result of an exchange in due time, consequential damage to the milling chisel and the chisel holders can be prevented. It can additionally be provided that the detected milling texture and/or the evaluation result are stored in a storage device which can be used for quality assurance for example. In particular, the production of an undesirable herringbone pattern can also be monitored and can be prevented by initiating countermeasures.

According to a preferred further development according to one embodiment, the evaluation device is arranged to determine the precise position of a worn and/or failed milling chisel in the milling roller on the basis of the detected milling texture. The determined position of a milling chisel to be exchanged can be indicated to the machine operator on the display device for example. The occurring standstill period of the ground milling machine for maintenance work can be reduced considerably thereby.

According to a preferred further development according to one embodiment, the detection device is based on the principle of optical scanning of the milling texture produced by the milling roller or milling chisels, or it can operate according to this principle. In this case, the detection device preferably comprises at least one camera and that the evaluation device comprises an image processing module (which can also be a software module), which determines or detects or even forecasts the wear and tear and/or failure of at least one milling chisel on the basis of differences in contrast, brightness and/or color in the detected milling texture. In particular, elevations of material in the milling texture caused by breakage of a chisel can be detected in this manner. This procedure can also comprise a photogrammetric method.

According to a preferred further development according to one embodiment, the detection device is based on the principle of laser scanning of the milling texture produced by the milling roller or the milling chisels, or it operates according to this principle. In this process, the milling texture produced by the milling roller or the milling chisels will be scanned linearly and transversely to the milling direction. Light-spot scanning (by means of an optical scanning device) or the like can also be provided instead of laser scanning. The milling texture detected by means of laser scanning will be supplied to the evaluation device as already described above, which evaluation device will evaluate the detected milling texture with respect to wearing phenomena and/or failure phenomena in the milling chisels. In particular, elevations in the material caused by chisel breakage can be detected in the milling texture in this manner. Laser scanning devices (laser scanners) are available on the market as ready-to-install modules. However, the proposed application is not known from the prior art.

According to a preferred further development according to one embodiment, the detection device is based on the principle of sonic wave scanning of the milling texture produced by the milling roller or the milling chisels, or it operates according to this principle. The further processing of the detected milling texture occurs as described above. The sonic wave scanning can be ultrasonic wave scanning for example. Sonic wave scanning devices (sonic wave scanners) are available on the market as substantially ready-to-install modules. However, the proposed application is not known from the prior art.

According to a similarly preferred further development according to one embodiment, the detection device is based on the principle of radio wave scanning of the milling texture produced by the milling roller or the milling chisels, or it operates according to this principle. The further processing of the detected milling texture occurs as described above. The radio wave scanning can be radio wave scanning for example. Radio wave scanning devices such as radio wave scanners are available on the market as substantially ready-to-install modules. However, the proposed application is not known from the prior art.

According to a preferred embodiment, the detection device and the evaluation device are also arranged for detecting the profile and the cover profile of a ground structure, in particular the cover profile of a road cross section at a specific section point. Optionally, the progression of the cover profile in the direction of progression (e.g., in the longitudinal direction of the road) can also be determined. This can occur independently of the detection and evaluation of a produced milling texture. The so-called pitch of a road cross section is of particular interest in this respect. The determined cover profile can be displayed to the machine operator on the display device and/or be stored in the storage device.

Furthermore, the present invention relates to a ground milling machine which comprises at least one monitoring apparatus in accordance with the present invention and according to the description above. Such a ground processing machine can be a ground stabilizing machine, a ground recycling machine or especially a road milling machine. According to one embodiment of the present invention, such a ground milling machine is preferably arranged in such a way that in the case of a deterioration in the milling texture (e.g., clear deviation from a target specification) as recognized by the monitoring apparatus, there will be an automatic adjustment of the advancement and/or milling roller speed via a control device, which can be performed in a control loop for example. Especially undesirable herringbone patterns during fine milling and/or during milling with low milling depths can especially be prevented in this manner. The coupling between the monitoring apparatus in accordance with the present invention and the control device occurs via a machine-internal CAN bus for example.

BRIEF DESCRIPTION OF THE DRAWINGS

The present invention will be described below in closer detail by reference to the drawings by way of example and in a non-limiting manner, wherein the drawings schematically show the following.

DETAILED DESCRIPTION OF THE INVENTION

Figure 1:
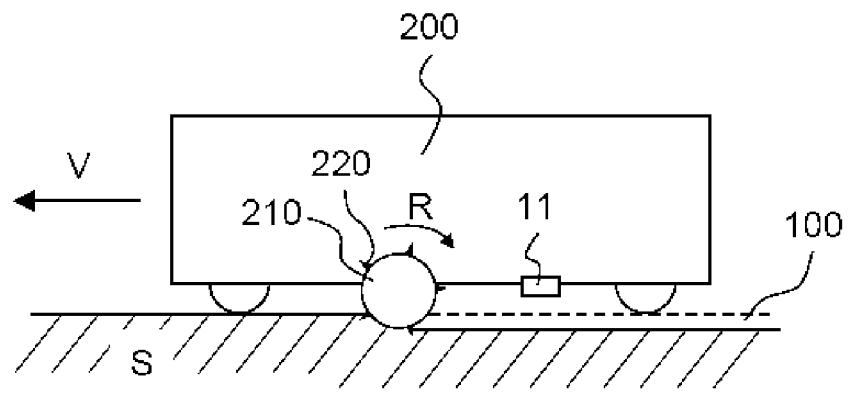
FIG. 1 shows an exemplary ground milling machine during the milling process in a side view.

FIG. 1 shows a generally known ground milling machine 200 with a milling roller 210 (see DE 102 03 732 A1 for example). The milling roller 210 is used for removing a ground surface, with a so-called milling texture being produced in the ground structure S (e.g., in a road surface) by the removal. The ground milling machine 200 moves in the direction of advancement V relative to the ground structure S, with the ground surface of the ground structure S being removed or milled off with a defined height by means of the milling roller 210 rotating in the direction R and the milling chisels 220 which are arranged on the milling roller. The milling texture produced by the removal of material is designated with reference numeral 100. The produced milling texture 100 can be detected in accordance with the principles of the present invention by at least one detection device 11 in a contactless manner, the detection device being disposed behind the milling roller 210 relative to the direction of advancement or milling direction V, and will be evaluated in an automated manner by means of an evaluation device, which will be described below in closer detail.

Figure 2:
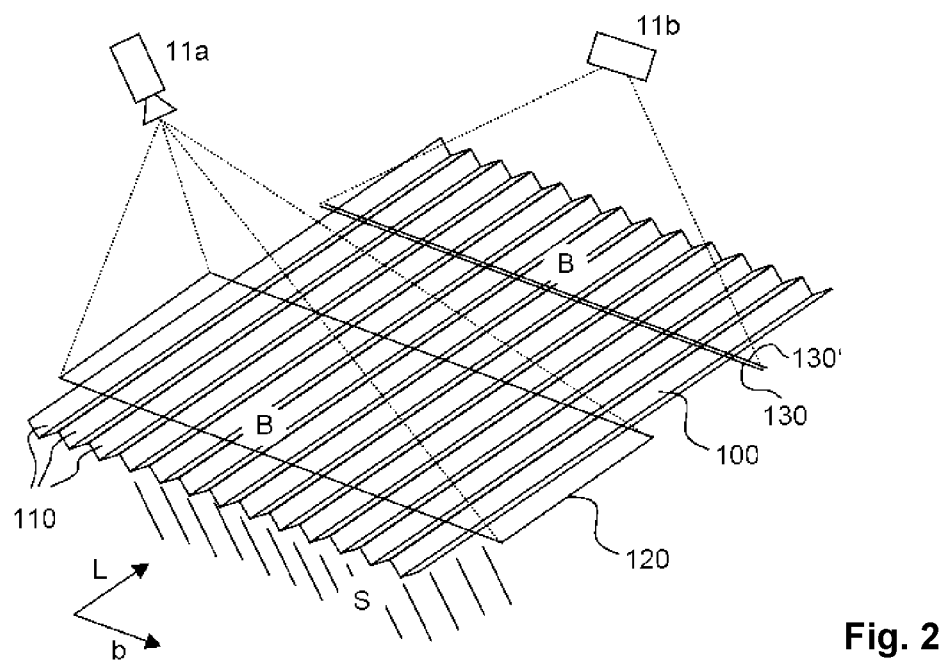
FIG. 2 shows a perspective view of a milling texture produced with the ground milling machine of FIG. 1.

FIG. 2 shows the milling texture 100 by way of example, which texture was produced by the milling roller 210. The milling texture 100 has a longitudinal milling direction L which corresponds to the direction of advancement or milling direction V of the milling roller 210 in the milling process. In the longitudinal direction L, the milling texture 100 comprises a plurality of grooves or flutes 110 which were introduced into the ground structure S by means of the milling roller 210 or more precisely by means of the milling chisels 220 or milling blades arranged on the roller.

The produced milling texture 100 will change under wear and tear and/or upon the failure of one or several milling chisels. Wear and tear can lead to a reduction in the depth of the furrows and/or to changes in the cross sectional shape of the furrows. A breakage of a chisel can lead to a so-called elevation in the material (cf. DE 102 03 732 A1) because the ground material in the region of the damage milling chisel will no longer be removed sufficiently. Both cases are undesirable. It is therefore proposed in accordance with the principles of the present invention that the milling texture 100 produced by the milling roller 210 is detected in a contactless fashion and the detected milling texture is automatically evaluated with respect to wear and tear and/or the failure of at least one milling chisel 220. According to a further aspect of the present invention, the quality of the produced milling texture 100 can also be evaluated automatically.

The detection of the produced milling texture 100 can occur by means of at least one optical detection device for example, which especially comprises at least one camera 11a. This camera 11a will be used to detect the produced milling texture 100 after its introduction into the ground structure S in a rectangular area 120 for example. This detection can occur continuously or discontinuously, as already described above. Reference numeral B designates the detection width in the transverse direction b. The camera 11a is, relative to the direction of movement V, arranged on the ground milling machine 200 behind the milling roller 210 in such a way that it can optically detect the detection area 120. An arrangement which is central and orthogonal with respect to the detection area 120 is not mandatory. The milling texture detected by the camera 11a will be supplied to an evaluation device 12 (cf. FIG. 3), as will be described below in closer detail.

Alternatively and/or additionally, the detection of the produced milling texture 100 can also occur by means of at least one laser scanning device 11 b, which linearly scans the produced milling texture 100 after its introduction into the ground structure S in a repeated manner in the transverse direction b and transversely to the longitudinal extension direction L, which is indicated in FIG. 2 with the lines 130 and 130'. The aforementioned description concerning the camera 11a also apply analogously to the fixing of the laser scanning device 11b to the ground milling machine 200.

Figure 3:
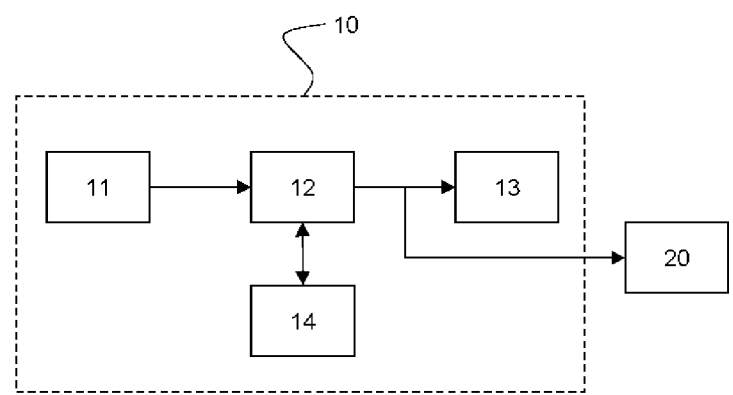
FIG. 3 shows a block diagram of a monitoring apparatus in accordance with the present invention.

FIG. 3 schematically shows a monitoring apparatus according to one embodiment of the present invention which is designated in its entirety with reference numeral 10. The monitoring apparatus 10 comprises a detection device 11 which may comprise a camera 11a and/or a laser scanning device (laser scanner) 11b. In connection with the ground milling machine 200 shown in FIG. 1, the milling texture detected by the detection device 11 will be transferred subsequently or simultaneously to an evaluation device 12.

The evaluation device 12 especially concerns a computer or a microprocessor device. It may be necessary to prepare the milling texture detected by the detection device 11 prior to transfer to an evaluation device 12. The evaluation device 12 evaluates the detected milling texture.

In this process, the detected milling texture may be compared with a previously detected and intermediately stored milling texture or with a milling texture stored in a storage device 14. During automated evaluation in the evaluation device 12, any impermissible wear and tear of one or several milling chisels or even the failure (chisel breakage) can automatically be recognized and can optionally even be forecast, and the machine operator can be informed thereof via a display device 13. The machine operator will ideally also be informed of where the respective milling chisel 220 is disposed on the milling roller 210. The machine operator can now bring the ground milling machine 200 to a standstill and exchange the defective milling chisel 220 or the complete milling roller 210.

A coupling of the evaluation device 12 with a control device 20 of the ground milling machine 200 can optionally also be provided, which allows automatically bringing the ground milling machine 200 to a standstill or changing its operating parameters in a suitable manner in case of impermissible deterioration in the produced milling texture 100 for reasons of excessive wear and tear of the chisels or chisel breakage.

Preferably, the evaluation device 12 also allows automatic evaluation concerning the quality of the produced milling texture 100. The detected milling texture and/or the result of the evaluation can be stored for quality assurance in the storage device 14.

Figure 4:
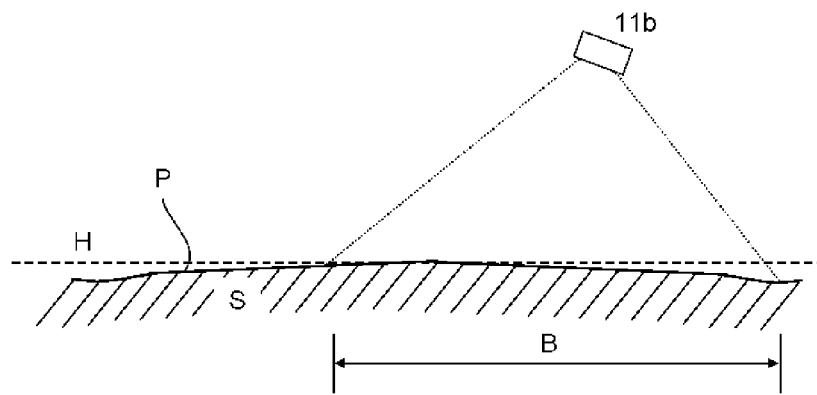
FIG. 4 shows the use of a monitoring apparatus in accordance with the present invention for determining the cover profile of a road cross section in a sectional view.

According to a preferred further development, the monitoring apparatus 10 according to the principles of the present invention can also be used for determining and/or monitoring the profile and especially the cover profile of a ground structure S and especially the cover profile of a road cross section. This is shown in FIG. 4. The cover profile P of the ground structure S which deviates from the horizontal H is detected over the detection width B (in the transverse direction b; cf. FIG. 2) in a preferred manner by means of a laser scanning device 11b and evaluated in the evaluation device 12. The determined cover profile P can be displayed on the display device 13 to the machine operator and/or be saved to the storage device 14. A profile P which is produced by milling for example (e.g., with the ground milling machine 200 as shown in FIG. 1, for example) and which is monitored by the monitoring apparatus 10 can also be adjusted in a control loop to a target specification.

While the present invention has been illustrated by description of various embodiments and while those embodiments have been described in considerable detail, it is not the intention of applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicants' invention.

What is claimed is:

1. A monitoring apparatus for a ground processing machine, with said ground processing machine being implemented as a ground milling machine and comprising at least one milling roller having a plurality of milling chisels for mechanically processing a ground surface, comprising:
   at least one detection device for contactless detection at least in sections of a condition of a milling texture produced by the milling roller; and
   an evaluation device for automated evaluation of the condition detected by the detection device, wherein the evaluation device is arranged for determining the wear and tear and/or the failure of at least one milling chisel from the plurality of milling chisels on the basis of a comparison between a momentarily detected milling texture and a milling texture detected at an earlier point in time, and further wherein the evaluation device is arranged for determining the precise position of a worn and/or failed milling chisel in the milling roller on the basis of the detected milling texture.

2. The monitoring apparatus according to claim 1, wherein the detection device is based on the principle of optical imaging or scanning.

3. The monitoring apparatus according to claim 2, wherein the detection device comprises at least one camera and the evaluation device comprises an image processing module.

4. The monitoring apparatus according to claim 1, wherein the detection device is based on the principle of scanning by means of laser, infrared, sound or x-rays.

5. The monitoring apparatus according to claim 1, wherein the detection device is based on the principle of planar imaging, planar scanning and/or linear scanning.

6. The monitoring apparatus according to claim 1, wherein the evaluation device is arranged for automatically determining the wear and tear and/or the failure of at least one milling chisel on the basis of the detected milling texture.

7. The monitoring apparatus according to claim 6, wherein the detection device is based on the principle of optical scanning of the milling texture as produced by the milling roller.

8. The monitoring apparatus according to claim 7, wherein the detection device comprises at least one camera and the evaluation device comprises an image processing module which is capable of determining the wear and tear and/or the failure of a milling chisel on the basis of differences in contrast, brightness and/or color in a detected milling texture.

9. The monitoring apparatus according to claim 6, wherein the detection device is based on the principle of laser scanning of the milling texture produced by the milling roller.

10. The monitoring apparatus according to claim 6, wherein the detection device is based on the principle of soundwave scanning of the milling texture produced by the milling roller.

11. The monitoring apparatus according to claim 6, wherein the detection device and the evaluation device are arranged for determining a cover profile (P) of a road cross section.

12. The ground processing machine, comprising at least one monitoring apparatus according to claim 1.

13. The ground processing machine according to claim 12, wherein it is arranged in such a way that the ground milling machine is automatically brought to a standstill or its operating parameters are changed automatically via a control device following a deterioration in the produced milling texture as recognized by the monitoring apparatus.

* * * * *